Aug. 26, 1952 — E. W. SHAND — 2,608,475
APPARATUS FOR USE IN CONVERTING HYDROCARBONS
Filed May 28, 1947
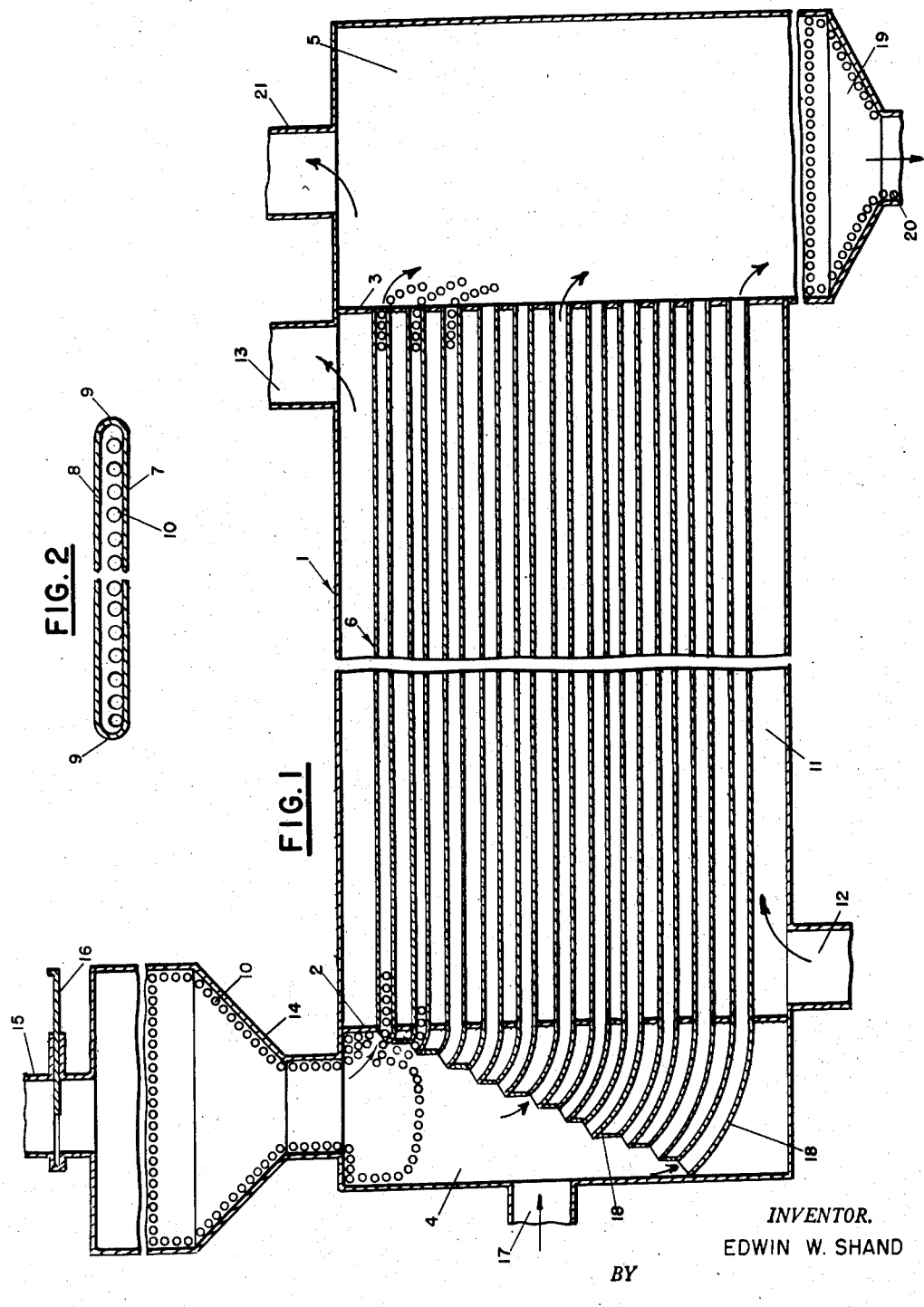
INVENTOR.
EDWIN W. SHAND
BY
Pennie, Edmonds, Morton & Barrows
ATTORNEYS Patented Aug. 26, 1952

2,608,475

UNITED STATES PATENT OFFICE 2,608,475

APPARATUS FOR USE IN CONVERTING HYDROCARBONS

Edwin W. Shand, Homewood, Ill., assignor to Sinclair Refining Company, New York, N. Y., a corporation of Maine Application May 28, 1947, Serial No. 751,113

1 Claim. (Cl. 23—288)

This invention relates to pyrolytic conversion of hydrocarbons and more particularly to pyrolytic conversion processes involving the use of catalysts.

In the conversion of hydrocarbon base stocks to produce products having desired properties, such as high octane number for use in gasoline, the stock is submitted to one of several processes, such as cracking, hydrogenation, dehydrogenation, etc., in the presence of a catalyst adsorbed on a carrier.

In many of such processes the catalyst is in pellet form or the catalyst comprises a coating of a metal or metal oxide on pellets of clay, silica or the like. After such catalysts have been used for a period of time, they must be removed from the treating zone and regenerated by burning off the carbon which has been deposited on the pellets. The present invention relates to a method of and apparatus for converting hydrocarbons in which the catalyst is periodically removed for regeneration in a simple and inexpensive manner.

In carrying out the process, I employ a treating chamber consisting of a plurality of separate passages or trays of considerable width and length but of a height only slightly greater than that of the individual beads or pellets of catalyst. The catalyst is delivered to these treating chambers at the inlet end of the apparatus in such manner that it forms a layer of a single thickness. The charge oil to be treated is also fed into the inlet end of the apparatus and the velocity of the charge is such that the pellets or beads are rolled along the floor of the sections of the chamber during which time the conversion operation takes place. At the outlet end of the apparatus the treated vapors are discharged and may be taken to suitable apparatus, such as fractionators, condensers, separators, stabilizers or the like. The catalyst is collected in a suitable hopper and delivered to a conveyor whence it is carried to a regenerating chamber. The regenerating chamber may be constructed similarly to the treating chamber with the catalyst beads delivered at the inlet end and propelled through it by the air normally used in regeneration of the catalyst. The length of the treating chamber may be correlated to the particular process to be performed to accomplish two results. The length of the chamber may be such that the charge oil vapors in passing through the chamber are in contact with the catalyst for the proper length of time to perform the desired converting operation. Also the length of the chamber may be such that the catalyst is employed for a length of time to put it in condition ready for regeneration when it reaches the outlet end of the chamber.

In the accompanying drawing I have shown an apparatus suitable for use in practicing the process and forming a part of the invention. In this showing:

Fig. 1 is a longitudinal, sectional view illustrating, somewhat diagrammatically, one form of apparatus suitable for use in practicing the process; and Fig. 2 is a transverse, sectional view of one of the treating chambers shown in Fig. 1.

Referring to the drawing, the reference numeral 1 designates generally an outer casing provided with headers 2 and 3 adjacent the inlet and outlet ends. This provides an inlet chamber 4 into which the catalyst and vapors are delivered and an outlet chamber 5 from which the treated vapors and spent catalyst are discharged.

Between the headers I provide a plurality of treating chambers 6. These chambers may be of whatever length is necessary for the practice of the particular process and of any desired width but are of a height slightly greater than the diameter of the spherical beads of which the catalyst is formed. As shown in Fig. 2, the chamber consists of a bottom 7, top 8 and side walls 9 and the distance between the top and bottom is approximately one and a half times the diameter of the catalyst beads 10. Heating gases may flow through the space between the headers, around the treating chambers 6 for the purpose of maintaining the desired temperature for the particular converting process and for this purpose the surrounding space 11 may be provided with an inlet pipe 12 and an outlet pipe 13.

The catalyst is delivered to the inlet chamber 4 from a hopper 14, the catalyst being fed to the hopper through an inlet 15 having a control valve 16 therein. The charge oil to be treated is delivered to the inlet space through a pipe 17. As shown, the ends of the chambers 6 extend into the space 4 a progressively increasing distance from top to bottom, as indicated at 18. Catalyst flowing into the space 4 from the hopper 14 is thus fed into the chambers 6 in a single layer and fills these chambers. At the outlet end of the apparatus the catalyst falls from the ends of the chambers 6 into a hopper 19 whence it is conveyed through a pipe 20 to a conveyor or other suitable apparatus and thence to a regenerating chamber. The treated stock is discharged from the chamber 5 through outlet pipe 21.

As stated, the charge oil is fed into the apparatus at a velocity sufficient to roll the catalyst beads along the bottoms 7 of the treating chambers 6. By maintaining the hopper 14 full of the catalyst beads, the catalyst in the chamber 4 tends to fill the space caused by movement of the beads toward the outlet end of the chamber. As the beads reach the outlet end, they fall into the hopper 19. By employing a proper catalyst and maintaining the chambers 6 at the desired temperature, the conversion operation, that is cracking or the like, occurs as the charge oil and catalysts travel through the various chambers 6 from the inlet end of the apparatus to the outlet end. The length of these chambers may be such that the charge oil is maintained in contact with the catalyst for the proper length of time to perform the desired converting operation. It may also be such that when the catalyst beads reach the outlet end of the apparatus, they are in such condition as to be ready for regeneration.

The process may be employed in connection with any of the processes of treating hydrocarbons in which the catalyst is in the form of beads or pellets or in which a support or carrier of silica, clay or the like in the form of beads or pellets is employed with the catalyst arranged on the pellets in the form of a coating. Thus the process may be employed for treating a charge stock consisting either of gasoline or naphtha, boiling between 200 and 500° F., with a catalyst consisting of aluminum hydrosilicate for the purpose of increasing the octane number and lowering the sulphur content of the treated stock. The charge oil to be treated is vaporized, heated to a temperature of approximately 850° F. and delivered to the inlet 17, the catalyst in the form of beads being supplied to the hopper 14. The catalyst flows on to the floors 7 of the treating chambers and the vapors are fed at such velocity that they propel the catalyst beads through the apparatus. At the outlet end the treated vapors are conveyed through outlet 21 to a fractionating tower to separate them into desired fractions.

The process may also be used for dehydrogenation using a charge oil consisting of alkanes and a catalyst consisting of chromium oxide on pellets of alumina. The charge oil is heated to the required temperature and delivered to the inlet chamber 4 through pipe 17. The treated products from the outlet pipe 21 are passed through a separator to separate the liquid portions from hydrogen and gases. The liquid fraction is then fractionated to separate the alkanes from the alkenes.

I claim:

In an apparatus for use in converting hydrocarbons in the presence of substantially spheroidal catalyst pellets of uniform size comprising an inlet header, hopper means mounted on top of said header for delivering said pellets thereto, a plurality of horizontally extending and vertically spaced tray-like shallow chambers whose widths are many times their heights connected at their inlet ends to said header, said chambers defining a plurality of restricted passages adapted to maintain a wide free rolling catalyst bed at single pellet thickness, said inlet ends being slightly upturned and extending into said header a progressively increasing distance from top to bottom to provide single thickness catalyst pellet flow in said chambers, a hydrocarbon vapor inlet pipe connected to said header in a manner such that the vapor flows into said chambers and causes the pellets to be rolled therethrough, an outlet header connected to the outlet ends of said chambers, a treated vapor outlet mounted on said outlet header, and means for heating said chambers.

EDWIN W. SHAND.

REFERENCES CITED

The following references are of record in the file of this patent:

UNITED STATES PATENTS

| Number | Name | Date |
|---|---|---|
| 533,929 | Taylor | Feb. 12, 1895 |
| 1,297,833 | Govers | Mar. 18, 1919 |
| 2,371,619 | Hartley | Mar. 20, 1945 |
| 2,384,943 | Marisic | Sept. 18, 1945 |

FOREIGN PATENTS

| Number | Country | Date |
|---|---|---|
| 383,616 | Great Britain | Feb. 13, 1931 |
| 731,143 | France | May 24, 1932 |